(12) United States Patent
Li et al.

(10) Patent No.: US 7,970,043 B2
(45) Date of Patent: *Jun. 28, 2011

(54) SEARCHER FOR MULTIPLE ORTHOGONAL CHANNELS WITH KNOWN DATA—WCDMA STEP2 SEARCH

(75) Inventors: Yan Li, Mountain View, CA (US); Parvathanathan Subrahmanya, Santa Clara, CA (US); Naveed Zaman, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,534

(22) Filed: Aug. 20, 2010

(65) Prior Publication Data

US 2010/0309900 A1     Dec. 9, 2010

Related U.S. Application Data

(62) Division of application No. 11/836,941, filed on Aug. 10, 2007.

(51) Int. Cl.
*H04B 1/707* (2011.01)
(52) U.S. Cl. ........................................ 375/150; 375/368
(58) Field of Classification Search .................. 375/150, 375/368
See application file for complete search history.

(56) References Cited

U.S. PATENT DOCUMENTS 6,728,203 B2 * 4/2004 Wang ............................ 370/210
7,095,811 B1 8/2006 Shikh-Bahaei et al.
7,369,577 B2 5/2008 Darbel et al.

FOREIGN PATENT DOCUMENTS

| EP | 1363407 | 11/2003 |
|---|---|---|
| EP | 1391999 | 2/2004 |
| WO | WO03026147 | 3/2003 |
| WO | WO03085855 | 10/2003 |
| WO | WO2007051157 | 5/2007 |

OTHER PUBLICATIONS

Wang, E.; et al. Cell Search In W-CDMA, IEEE Journal On Selected Areas In Communications, Aug. 1, 2000, vol. 18, No. 8, Xp011055194.
International Search Report and Written Opinion—PCT/US2008/072701, International Search Authority—European Patent Office—Feb. 11, 2009.
Partial International Search, PCT/US2008/072701, International Searching Authority, European Patent Office, Dec. 2, 2008.

* cited by examiner

*Primary Examiner* — Kevin Y Kim
(74) *Attorney, Agent, or Firm* — Sayeh H. Beladi

(57) ABSTRACT

A circuit and algorithm are disclosed for a step2 search of a three step search of synchronization channels in a W-CDMA system. A mobile terminal of the CDMA system includes an RF downconverter for receiving I and Q signals. A searcher, responsive to the I and Q signals, includes a first correlator for correlating the I and Q signals with a primary synchronization code on a primary synchronization channel, and a second correlator for correlating I and Q signals with a secondary synchronization code on a secondary synchronization channel. The correlated I and Q signals are added for each of the secondary synchronization codes. An energy calculator and a maximum energy detector use the correlated I and Q signals of both the primary and secondary synchronization channels to detect the most likely scrambling code group of secondary synchronization codes.

20 Claims, 8 Drawing Sheets

SEARCHER FOR MULTIPLE ORTHOGONAL CHANNELS WITH KNOWN DATA—WCDMA STEP2 SEARCH

CLAIM OF PRIORITY UNDER 35 U.S.C. §120

The present Application for Patent is a Divisional and claims priority to U.S. patent application Ser. No. 11/836,941 filed Aug. 10, 2007, pending, and assigned to the assignee hereof and hereby expressly incorporated by reference herein.

FIELD OF DISCLOSURE

The present invention relates generally to CDMA communications systems, and more specifically to an improved method and apparatus for step2 W-CDMA searching.

BACKGROUND

Wireless communication systems provide various types of communication such as voice, data, video and the like. These systems are based on different modulations techniques such as code division multiple access (CDMA), time division multiple access (TDMA), etc. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. CDMA receivers commonly employ RAKE receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. Some systems, such as those defined by the W-CDMA standard, differentiate base stations using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. The period of 38,400 chips is referred to as a radio frame. Each radio frame is divided into 15 equal sections referred to as slots. W-CDMA base stations operate asynchronously in relation to each other, so knowledge of the frame timing of one base station does not translate into knowledge of the frame timing of any other base station. In order to acquire this knowledge, W-CDMA systems require synchronization channels and a cell searching technique.

Referring now to FIG. 1, a chart illustrates the various synchronization channels utilized in a W-CDMA system to perform synchronization. These channels include a Primary Synchronization Channel (Primary SCH) which is coded with a Primary Synchronization Code (PSC). The purpose of the PSC is to provide slot timing. There is also a Secondary Synchronization Channel (Secondary SCH) which is coded with one of 16 possible Secondary Synchronization Codes (SSC) per slot. A length 15-SSC sequence identifies the code group and frame timing. There is also the Common Pilot channel (CPICH) which is scrambled with primary scrambling codes. The CPICH is utilized to obtain the primary scrambling code. From FIG. 1, it can be appreciated that Primary SCH and the Secondary SCH are divided into 15 slots numbered Slot 0 through Slot 14, and that each slot is 2560 chips. Both the PSC and the SSC are 256 chips longs. There is also a Primary Common Control Physical Channel (PCCPCH) within a cell, and it is used to carry synchronization and broadcast information for users. The Primary CCPCH is not transmitted during the first 256 chips of each slot. Instead, the Primary SCH and Secondary SCH are transmitted during this period, the remainder being used for broadcast messages.

It is possible to search for W-CDMA base stations offset by offset (38,400 of them) for each of the 512 primary codes. However, this is not practical due to the excessive amount of time such a search would require. Instead, the W-CDMA standard calls for base stations to transmit the Primary SCH and the Secondary SCH, to assist the mobile terminal in searching efficiently. As a result, a W-CDMA cell search can be performed in three steps.

For initial acquisition, the three-step W-CDMA search technique provides a substantial performance increase, in terms of reduced search time, over the impractical alternative of searching the entire PN space for each scrambling code. Probability of detection and search time are important metrics in determining the quality of a CDMA system. Decreased search time or higher probability of detection implies that searches can be done faster or less often. As such, a subscriber unit can locate and access the best available cell faster or more reliably using less power, resulting in better signal transmission and reception, often at reduced transmission power levels by both the base station and the subscriber unit. This, in turn, increases the capacity of the CDMA system (either in terms of support for an increased number of users, or higher transmission rates, or both). Furthermore, decreased search time is also advantageous when a subscriber unit is in idle mode, a low-power state where a subscriber unit is not actively transmitting or receiving voice or data, but is periodically monitoring the system. Reduced search time allows the subscriber unit to spend more time in the low power state, thus reducing power consumption and increasing standby time.

In a conventional three step cell searching technique, step2 is performed using only the SSC signal. One such cell searching technique is described in U.S. Pat. No. 6,768,768, by Rao, et al., entitled "Method and apparatus for step two W-CDMA searching", which is incorporated herein by reference in its entirety and which assigned to the assignee of the present application. The '768 patent discloses several embodiments for improving the second searching step. In one embodiment of the '768 patent, a plurality of codes or SSCs, are correlated with a received signal at a plurality of offsets to produce a code/slot energy corresponding to each code/slot boundary pair. Unique subsets of the code/slot energies are summed to produce code sequence energies, the maximum of which indicates a located code sequence and slot boundary. In another embodiment of the '768 patent, the correlation is performed by sub-correlating the received signal with a common sequence, and performing a Fast Hadamard Transform (FHT) on the results. In yet another embodiment, one sub-correlator can be used to search a plurality of peaks simultaneously.

Referring now to FIG. 2, a block diagram illustrates the hardware of the Rao '768 patent for performing one of the conventional step2 search algorithms. FIG. 1 depicts a searcher 430 having I and Q samples which enter correlator 510, where they are correlated with each of the sixteen SSCs. The correlator 510 contains sub-correlator 520, FHT 530, and energy calculator 535. Sub-correlator 520 produces a length-16 sub-correlation sequence for delivery to FHT 530. The results of the correlator 510 are stored in memory 540. The energy results for multiple frames may be accumulated and stored in memory 540 Summer 550 reads SSC/slot energy values out of memory 540 according to a predetermined SSC sequence for each slot hypothesis. The SSC/slot energies are added to produce a SSC sequence energy. The SSC sequence energies are delivered to maximum energy detector 560 for detection of the maximum energy, which corresponds to the most likely scrambling code group and frame timing. Summer 550 and maximum energy detector 560 may be combined in one circuit, or the functions of both can be carried out in a DSP.

Another cell searching technique is described in an article by Y.-P. E Wang, T. Ottosson, which is entitled "Cell search in W-CDMA", IEEE Journal on Selected Areas in Communications, Vol 18, Issue 8, August 2000, page 1470-1482, which is incorporated herein in its entirety. In this technique, the authors proposed a coherent detection method, using the phase of PSC correlation to correct the phase of SSC correlation. The idea is that the random phase $\phi_k$ can be estimated using PSC correlation. This estimated phase can then be used to phase-correct the SSC correlation.

W-CDMA searchers designed to reduce search time will improve the speed and performance of the mobile terminal In addition, however, efficiency of implementation is also important to reduce integrated circuit area and power consumption. Step 2 of the three step search method described above is a complex procedure, and there is therefore a need in the art for efficient searchers that can perform step2 W-CDMA searching.

SUMMARY

Exemplary embodiments of the invention are directed to systems and method for step2 W-CDMA searching.

Accordingly, an embodiment of the invention can include a method for searching for a secondary synchronization code, the method comprising: correlating both a primary synchronization channel and a secondary synchronization channel; obtaining a first estimate that is a function of the primary synchronization channel and secondary synchronization channel, for a correct secondary synchronization code; and obtaining a second estimate that is a function of the primary synchronization channel for an incorrect secondary synchronization code.

Another embodiment can include a circuit for performing a search of the synchronization channels in a CDMA system, including at least a primary synchronization channel and a secondary synchronization channel, comprising: a correlator to perform the correlation of I and Q signals with the primary synchronization code and the secondary synchronization code; an energy calculator responsive to the output of the correlator; and a maximum energy detector, responsive to the energy calculator, for detecting the most likely scrambling code group of secondary synchronization codes.

Another embodiment can include a mobile terminal in a WCDMA system, comprising: an RF downconverter for receiving I and Q signals; a searcher, responsive to the I and Q signals, including: a first correlator for correlating I and Q signals with a primary synchronization code; a second correlator for correlating I and Q signals with a secondary synchronization code; a first adder for adding the correlated signals I and Q signals from the first correlator and the second correlator, for each of the secondary synchronization codes; an energy calculator responsive to the output of the first adder; and a maximum energy detector, responsive to the energy calculator, for detecting the most likely scrambling code group of secondary synchronization codes.

Another embodiment can include a circuit for performing a search of the synchronization channels in a WCDMA system, including at least a primary synchronization channel and a secondary synchronization channel, comprising: correlator means for performing the correlation of I and Q signals with the primary synchronization code and the secondary synchronization code; means for performing an energy calculation in response to the output of the correlator means; and means for detecting the maximum energy in order to determine the most likely scrambling code group of secondary synchronization codes.

Another embodiment can include a circuit for performing a search of the synchronization channels in a WCDMA system, including at least a primary synchronization channel and a secondary synchronization channel, comprising: means for adding primary synchronization code and secondary synchronization code inputs; correlator means for performing the correlation of I and Q signals with the added primary synchronization code and the secondary synchronization code inputs; means for performing an energy calculation in response to the output of the correlator means; and means for detecting the maximum energy in order to determine the most likely scrambling code group of secondary synchronization codes.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
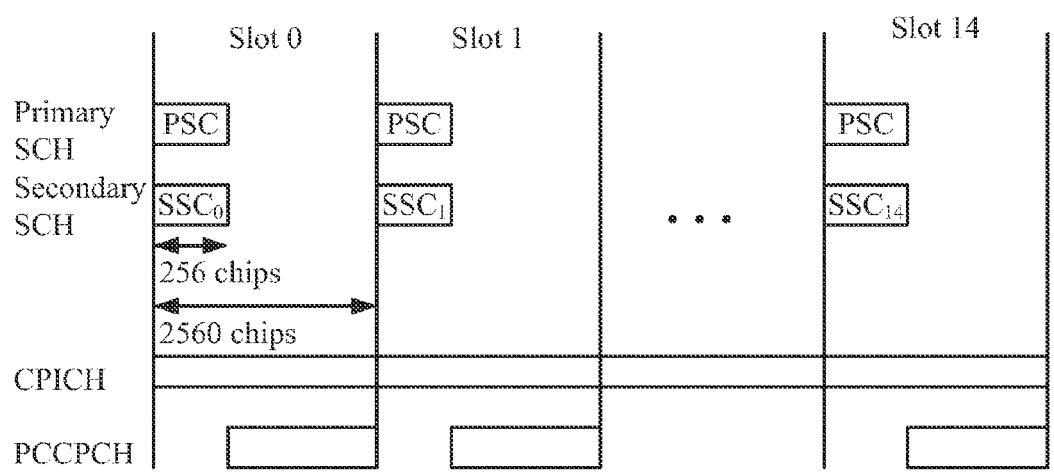
FIG. 1 is a chart which illustrates the various synchronization channels in a W-CDMA system.
Figure 2:
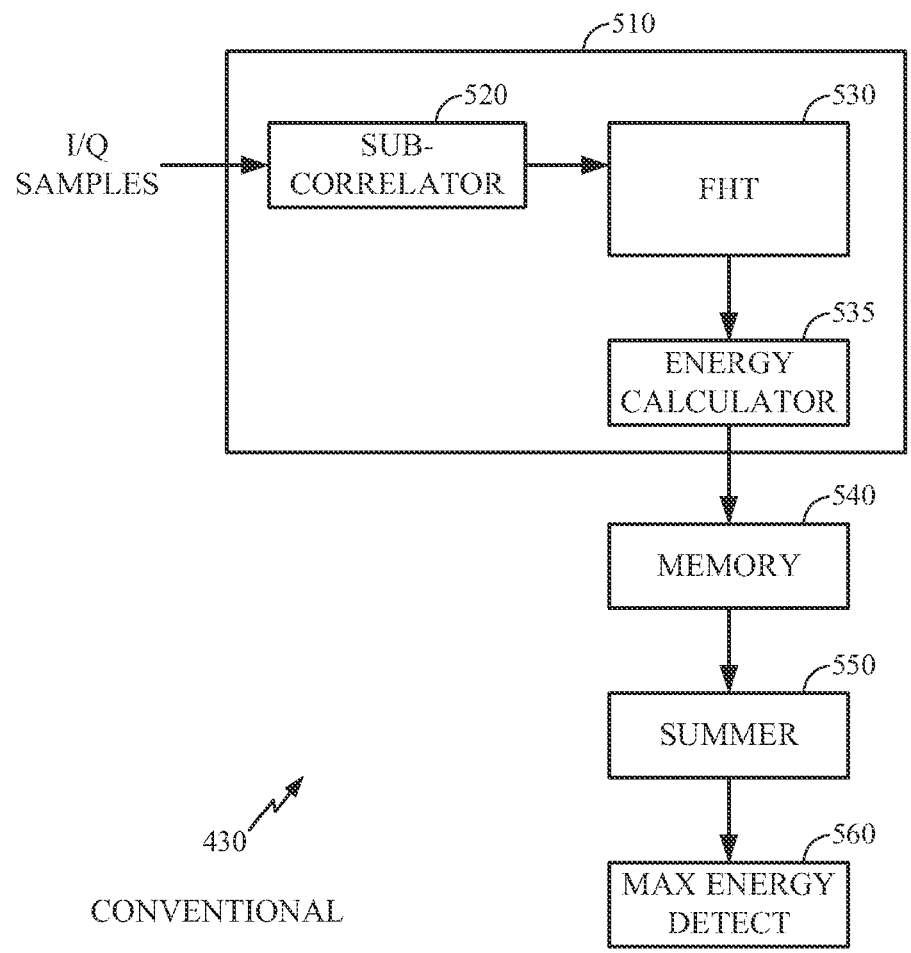
FIG. 2 is a block diagram of hardware for performing the conventional step2 search algorithm.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Listed below is a glossary of acronyms and symbols utilized in this specification:
AWGN—Additive white Gaussian noise
bpg—Block Processing Group
CD—Coherent Detection
CDMA—Code Division Multiple Access
conv—conventional
CPICH—Common Pilot Channel
CSIM—A software simulation program
dB—Decibel
DSP—Digital Signal Processor
FHT—Fast Hadamard Transform
fe—Frequency error.
GHz—Gigahertz
$H_0$—Hypothesis without Signal
$H_i$—Hypothesis with Signal and SSC group i
JPH—Joint Phase and Hypothesis
k—Slot number
kHz—Kilohertz
km/h—kilometers per hour
Matlab®—A commercial mathematics/simulation program
ms—millisecond
Nc—Accumulation length in units of slot
ppm—parts per million
PSC—Primary Synchronization Code
Re—Real part
SCH—Synchronization Channel
SSC—Secondary Synchronization Code
Step1—Step One of CDMA cell search
Step 2—Step Two of CDMA cell search
Step 3—Step Three of CDMA cell search
TDMA—Time Division Multiple Access
W-CDMA—Wideband Code Division Multiple Access
$\alpha_k$—Channel Gain
$\phi_k$—Random Phase
$\sigma_2$—noise power
$n_k$—The i.i.d. complex AWGN noise vector
$y_k$—The first 256-chip signal received in slot number k Embodiments of the invention include an algorithm for WCDMA cell search step2. The novel algorithm outperforms the conventional methods, if the same accumulation length is used. Also, provided is a theoretical analysis as well as simulation results to demonstrate the performance gains. The step2 search time can be reduced from 30 ms to 20 ms and the detection probability is increased (e.g., 10% at −9 dB geometry) even with the reduced search time.

Figure 3:
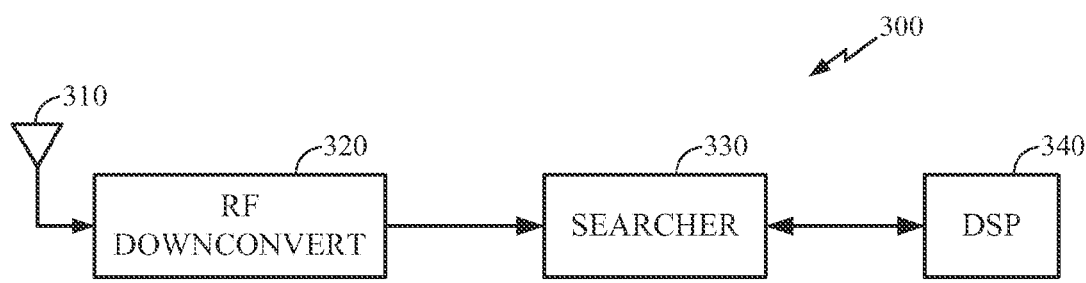
FIG. 3 is a block diagram of a wireless device for performing the novel step2 search algorithm.

Referring now to FIG. 3, a block diagram illustrates a mobile terminal 300 for performing the novel step2 search algorithm of the present invention. Only a subset of the components of a mobile terminal unit 300 are shown. Signals are received at antenna 310, and delivered to RF downconvert block 320 for amplification, down conversion, and sampling. Various techniques for down converting CDMA signals to baseband are known in the art. From RF downconvert block 320, I and Q samples are delivered to searcher 330. Searcher 330 is in communication with a digital signal processor (DSP) 340. Alternatives to employing a DSP include using another type of general purpose processor, or specialized hardware designed for carrying out various tasks related to the novel search algorithm.

Embodiments of the invention assume that fading and phase are constant over one block processing group (hereinafter referred to as a "bpg") which is a 256 chip. It is assumed the signal is present. The false alarm scenario is described below. Denote $y_k$ to be the first 256-chip signal received in slot number k. It can be written as following:

$$y_k = \alpha_k(PSC+SSC_{k,i})e^{j\phi_k}+n_k, \text{ for hypothesis } H_i \quad (1)$$

where $\alpha_k$ is the magnitude of the channel gain, $\phi_k$ is the random phase due to frequency errors, initial phase offset, and the channel gain phase. $H_i$ is one of the 64×15 hypothesis (64 code groups with 15 possible frame boundaries). PSC and $SSC_{k,i}$ are the complex synchronization code in slot k for hypothesis i. $n_k$ is the i.i.d. complex AWGN noise vector with 256 elements. Each complex element includes a noise power of $\sigma^2$. Further, $\vec{y}=[y_1, y_2, \ldots, y_{Nc}]$ is defined to be the signal vector of Nc slots, where Nc is the accumulation length. Currently Nc is set to 45 (3 frames). Given y, a determination is made regarding the most likely hypothesis.

If only SSC is used to compute the correlation. The detection criterion becomes $$H_i = \mathrm{argmax}\{\Sigma|SSC_{k,i}y_k^*|^2\} \quad (2)$$

The joint phase and hypothesis estimation can be performed as follows. Define $\vec{\phi} = [\phi_1, \phi_2, \ldots, \phi_{Nc}]$ to the vector of the random phases. Then the conditional probability when the signal is present $$P(\vec{y} \mid H_i, \vec{\phi}) = \left(\frac{1}{\pi\sigma^2}\right)^{256N_c} e^{-\sum_{k=1}^{Nc} \frac{(y_k - \alpha_k(PSC + SSC_{k,i})e^{j\phi_k})(y_k - \alpha_k(PSC + SSC_{k,i})e^{j\phi_k})^*}{\sigma^2}} \quad (3)$$

Equation (3) can be further simplified to $$P(\vec{y} \mid H_i, \vec{\phi}) = \left(\frac{1}{\pi\sigma^2}\right)^{256N_c} e^{-\sum_{k=1}^{Nc} \frac{\|y_k\|^2 + \alpha_k^2 \|PSC + SSC_{k,i}\|^2 - 2\alpha_k Re\left((PSC + SSC_{k,i})e^{j\phi_k}y_k^*\right)}{\sigma^2}} \quad (4)$$

Now it is clear that $$(H_i, \vec{\phi}) = \text{argmax}\{\Sigma \alpha_k Re((PSC + SSC_{k,i})e^{j\phi_k}y_k^*)\} \quad (5)$$

For a given H-to maximize the term inside the sum, $\phi_k$ for each slot k has to be chosen as $$\phi_k = -\angle((PSC + SSC_{k,i})y_k^*)$$

$$Re((PSC + SSC_{k,i})e^{j\phi_k}y_k^*) = |(PSC + SSC_{k,i})y_k^*|$$

Thus, $$H_i = \text{argmax}\{\Sigma \alpha_k |(PSC + SSC_{k,i})y_k^*|\} \quad (6)$$

From equation (6), a calculation of the correlation of input samples with PSC and with SSC, and an addition the two results for each slot can be performed. However, the magnitude of the channel gain $a_k$ is not known. The channel gain can be estimated based on $|(PSC + SSC_{k,i})y_k^*|$, which is proportional to $a_k$ for the correct hypothesis. Thus, the equation (6) can be modified to be $$H_i = \text{argmax} \Sigma |(PSC + SSC_{k,i})y_k^*|^2 \quad (7)$$

Equation (7) also can be considered to have another interpretation for the correct hypothesis,
$E[y_k(PSC + SSC_{k,i})^*] = \alpha_k(\|PSC\|^2 + \|SSC_{k,i}\|^2)e^{j\phi_k}$. If the noise is ignored the result is $|(PSC + SSC_{k,i})y_k^*|^2 = \alpha_k(\|PSC\|^2 + \|SSC_{k,i}\|^2)e^{j\phi_k}(PSC + SSC)y_k^*$
For the incorrect hypothesis
$E[y_k(PSC + SSC_{k,i})^*] = \alpha_k \|PSC\|^2 e^{j\phi_k}$ and then if the noise is ignored $|(PSC + SSC_{k,i})y_k^* = \alpha_k(\|PSC\|^2)e^{j\phi_k}(PSC + SSO)y_k^*$
Thus $y_k(PSC + SSC_{k,i})^*$ essentially provides the estimates of the channel gain and the phase. Furthermore, it scales the channel gain by another factor of 2 for the correct hypothesis, since $\|PSC\|^2 = \|SSC\|^2$. Accordingly, the algorithm of equation (7) performs better than the coherent detection technique of Wang and Ottoson described above.

Note the expected value for JPH estimate under correct hypothesis is a function of PSC and SSC.

$$E|(PSC + SSC_{k,i})y_k^*|^2 = \alpha_k^2(\|PSC\|^2 = \|SSC_{k,i}\|^2)^2 + (\|PSC\|^2 + \|SSC_{k,i}\|^2)\sigma^2$$

where the expected value for JPH estimate under incorrect hypothesis is only a function of PSC:

$$E|(PSC + SSC_{k,i})y_k^*|^2 = \alpha_k^2(\|PSC\|^2)^2 + (\|PSC\|^2)\sigma^2$$

This is different with the coherent detection technique of Wang and Ottoson, in which the expected value for the correct hypothesis is $$E[Re((y_k PSC^*)(SSC_{k,i}y_k^*))] = \alpha_k^2 \|PSC\|^2 \|SSC_{k,i}\|^2$$

and the expected value for the incorrect hypothesis is $$E[Re((y_k PSC^*)(SSC_{k,i}y_k^*))] = E[\alpha_k(\|PSC\|^2 e^{j\phi_k} + n_k PSC^*)(SSC_{k,i}y_k^*)] = 0$$

This is because that SSC is orthogonal to PSC.

Figure 4A:
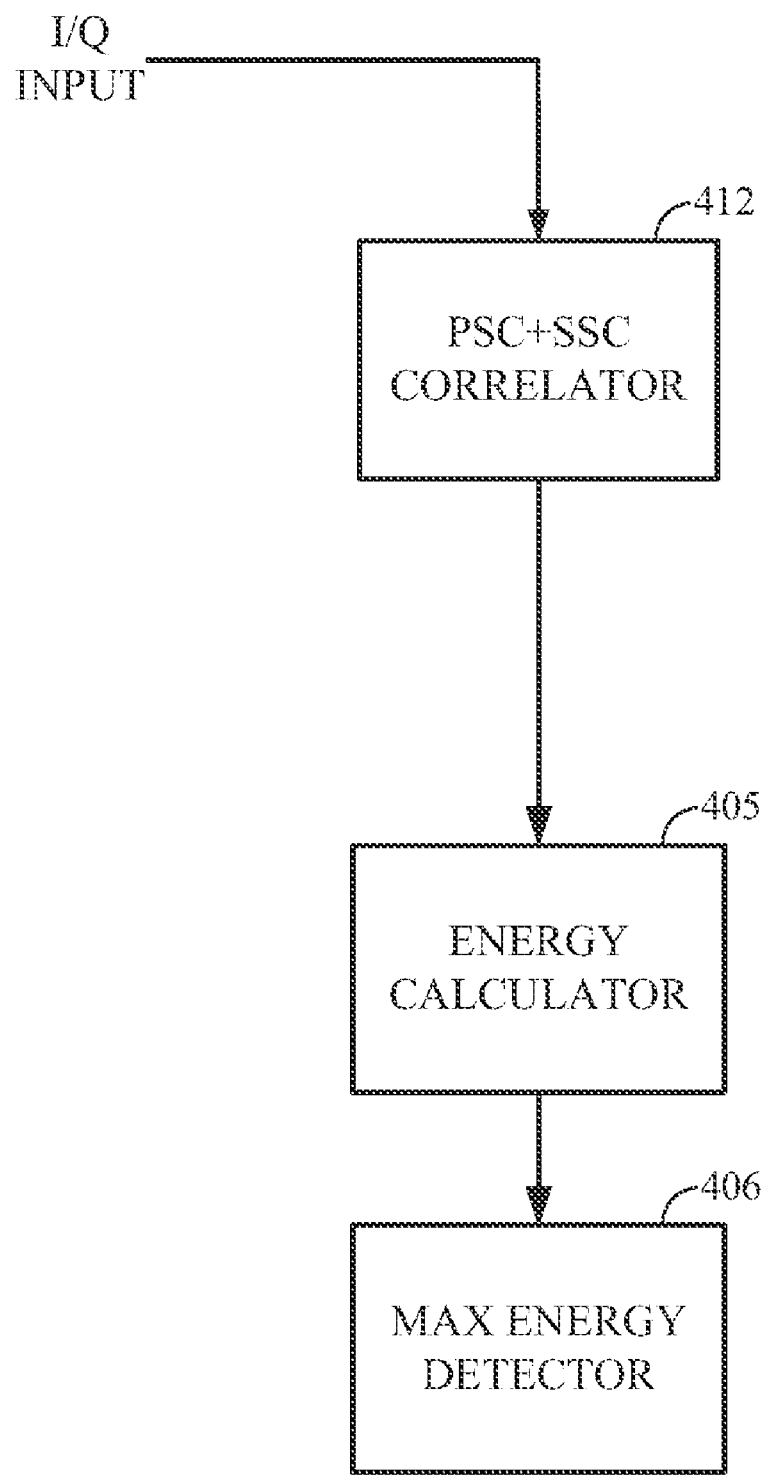
FIG. 4A is a block diagram of a generalized algorithm for performing the novel step2 search algorithm.
Figure 4B:
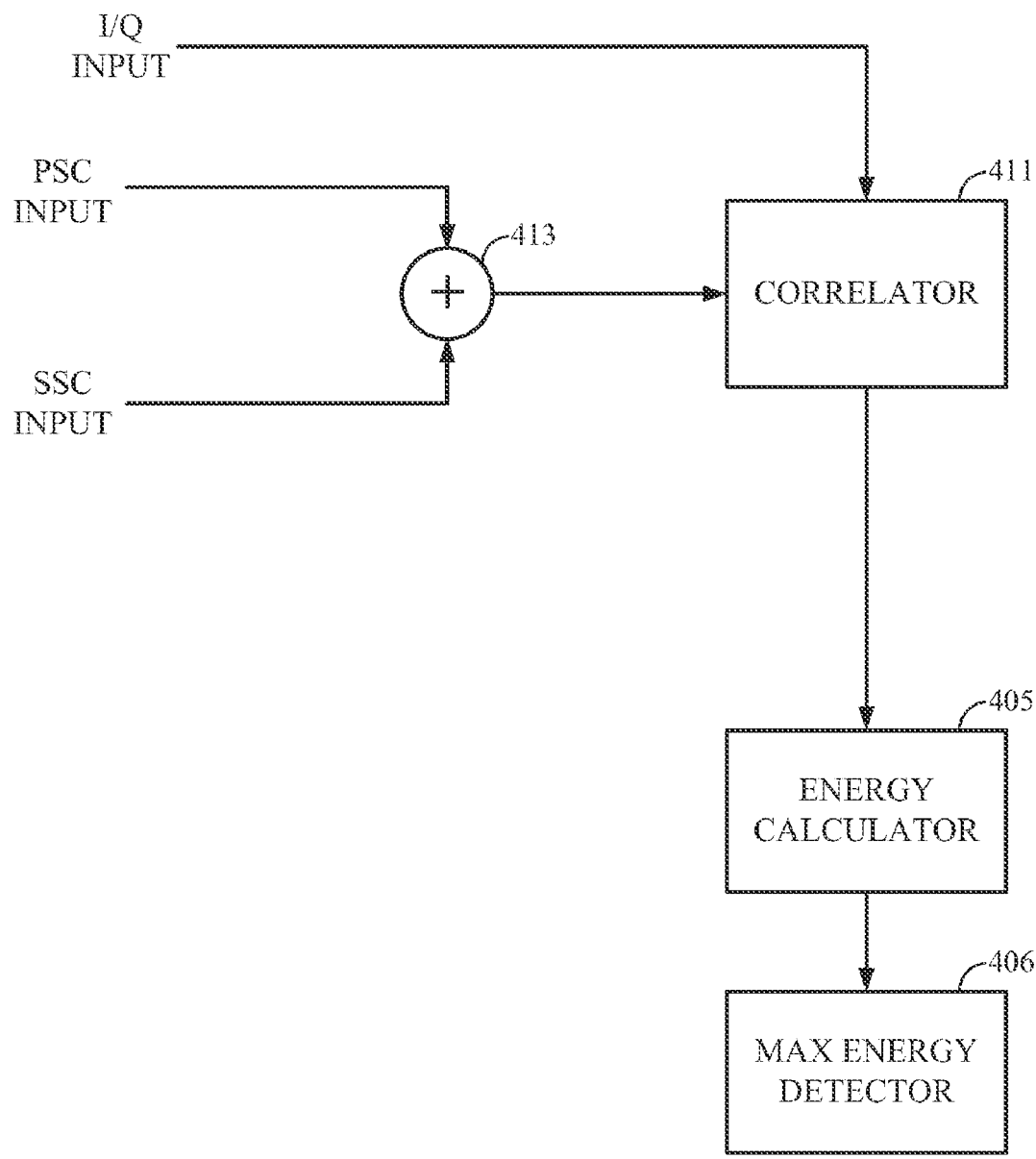
FIG. 4B is a block diagram of an alternative algorithm for performing the novel step2 search algorithm.

Referring now to FIG. 4A, a block diagram illustrates a generalized implementation of the joint-hypothesis and phase algorithm of the present application. The received I/Q input is applied to a PSC+SSC correlator 412 which correlates the received signal. The outputs of the PSC+SSC correlator 412 are applied to an energy calculator 405 which makes energy calculations, and a maximum energy detector 406 detects the most likely maximum energy. FIG. 4B illustrates an alternative algorithm in which the PSC and SSC I/Q inputs are added together by an adder 413 and correlated in a correlator 411 before being applied to the energy calculator 405.

An exemplary embodiment of the invention may include a circuit for performing a search of the synchronization channels in a CDMA system, including at least a primary synchronization channel and a secondary synchronization channel. The circuit preferably includes a correlator 412 to perform the correlation of I and Q signals with the primary synchronization code and the secondary synchronization code. An energy calculator 405 is responsive to the output of the correlator. A maximum energy detector 406, responsive to the energy calculator 405, detects the most likely scrambling code group of secondary synchronization codes.

In another exemplary embodiment of the invention having a hybrid adder-correlator, the PSC input and the SSC input are added to together with an adder 413 and applied to a correlator 411. The energy calculator 405 is responsive to the output of the correlator 411. The maximum energy detector 406, responsive to the energy calculator 405, detects the most likely scrambling code group of secondary synchronization codes.

Figure 5:
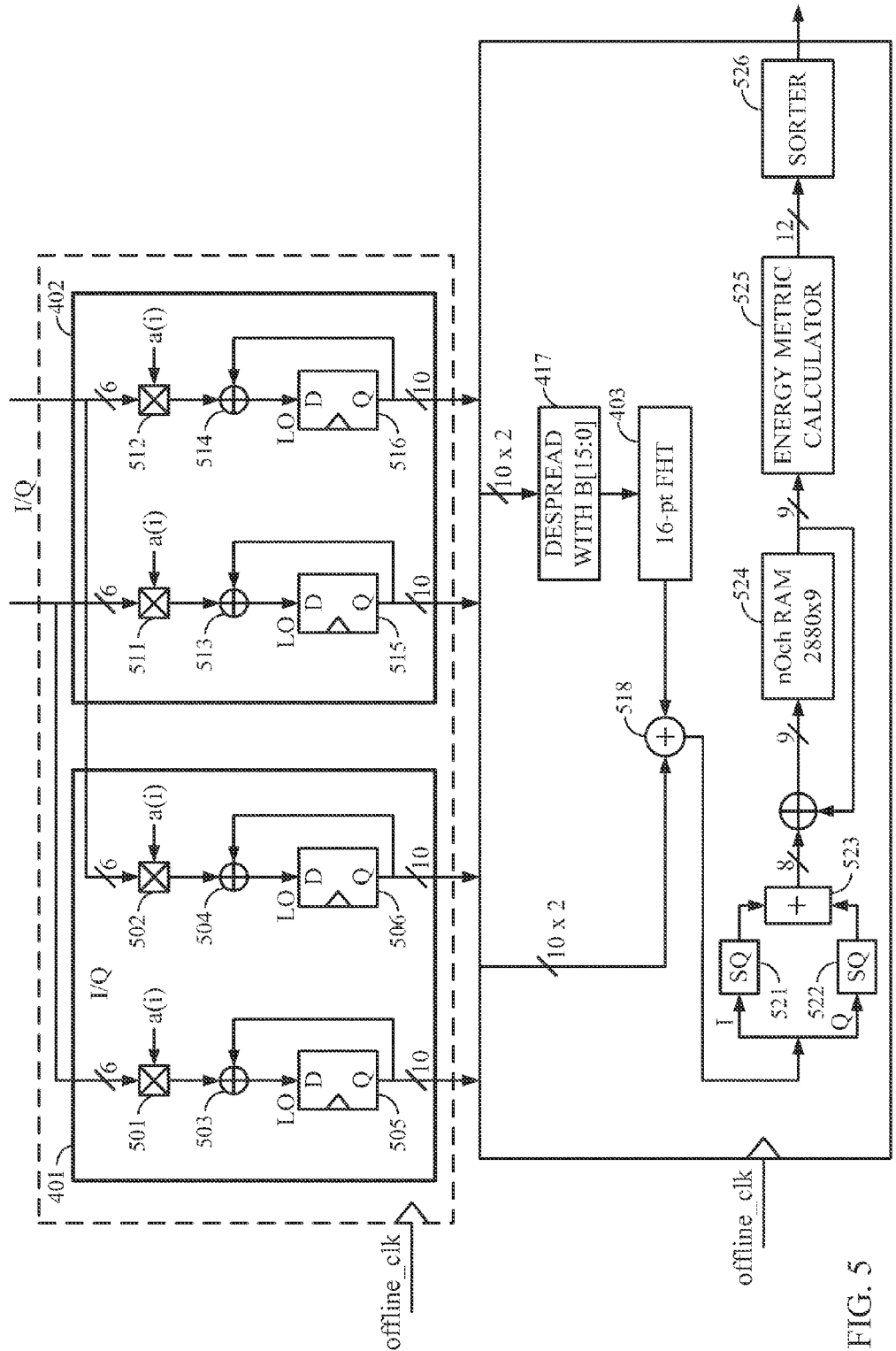
FIG. 5 is a block diagram of hardware for performing the novel step2 search algorithm.

Referring now to FIG. 5, a block diagram illustrates the hardware for performing the novel step2 search algorithm or Joint Phase-Hypothesis algorithm which includes the channel gain estimation that is expressed by the following equation:

$$Hi = \text{argmax} \Sigma |(PSC + SSC_{k,i})y_k^*|^2$$

To implement the Joint Phase-Hypothesis algorithm in a step2 engine, the PSC correlator 401 is needed to perform the (PSC y*) function. The PSC correlator 401 includes multipliers 501, 502 which separately multiply the received I and Q inputs by the PSC signal a(i) and apply the multiplied signal to adders 503, 504 and flip-flops 505, 506. Likewise, the SSC correlator 402 performs the (SSC y*) function. The SSC correlator 402 includes multipliers 511, 512 which separately multiply the received I and Q inputs by the SSC signal b(i) and apply the multiplied signal to adders 513, 514 and flip-flops 515, 516. The output from the flip-flops 515, 516 is applied to despread function 517 and a FHT 403. The I and Q of the PSC correlation are added to the I and Q of the SSC correlation by adder 518 for each of the sixteen SSCs. The $I^2 + Q^2$ are calculated using the squaring functions 521, 522 and adder 523. These values from the adder 523 are then stored in the energy matrix which includes non-coherent (ncoh) RAM 524 and energy matrix 525. The rest of the step2 algorithm including the sorter 526 is substantially the same as the conventional technique.

The performances of the algorithms described above have been evaluated and are compared based on the conditional probability of detection, and conditioned on the success of step1. The algorithms in consideration are listed below for clarity.

1. Conventional (SSH only):

$$H_i = \text{argmax}\{\Sigma |SSC_{k,i} y_k^*|^2\} \quad (8)$$

2. Coherent Detection (CD)

$$H_i = \text{argmax}\, \Sigma \text{Re}((y_k PSC^*)(SSC_{k,i} y_k^*)) \quad (9)$$

3. Joint Phase-Hypothesis with channel gain estimation (JPH)

$$Hz = \text{argmax}\, \Sigma |(PSC + SSC_{k,i}) y_k^*|^2 \quad (10)$$

The above three algorithms have been evaluated in three scenarios: AWGN with no frequency error, AWGN with the −3.6 kHz frequency error and single path high speed fading with speed of 350 km/h and no frequency error. The input samples were generated using a software program known as CSIM. The algorithms were implemented in the Matlab® software program in order to read these input samples and perform the step1 and step2 search.

Figure 6:
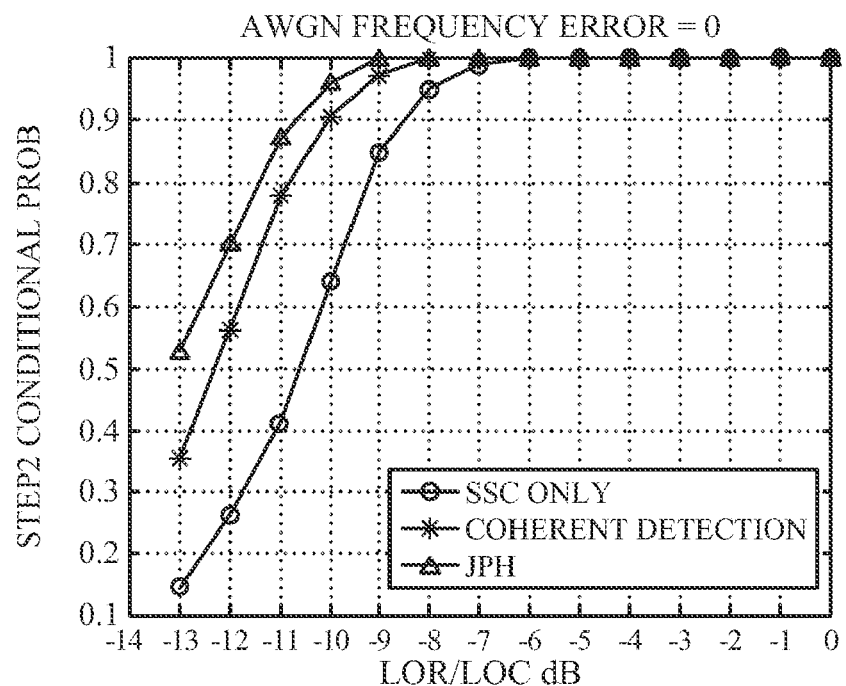
FIG. 6 is a graph that illustrates the performance of various algorithms under AWGN ("Additive White Gaussian Noise") with no frequency error.
Figure 7:
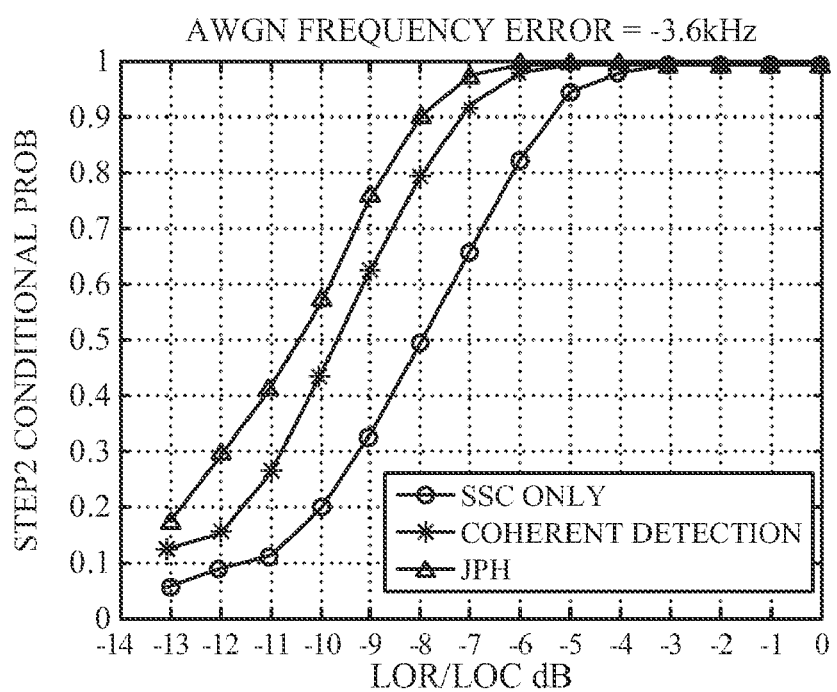
FIG. 7 is a graph that illustrates the performance of various algorithms under AWGN with -3.6 kHz frequency error.

FIG. 6 displays the performance under AWGN with no frequency error. It can be observed that the Coherent Detection method improves the performance by 1.5 dB over the conventional SSC only method. The JPH algorithm improves the performance by another 0.8 dB over the CD method, thus a 2.3 dB gain over the conventional method. FIG. 7 displays the performance under AWGN with -3.6 kHz frequency error. The same behavior has been observed as in FIG. 6.

Figure 8:
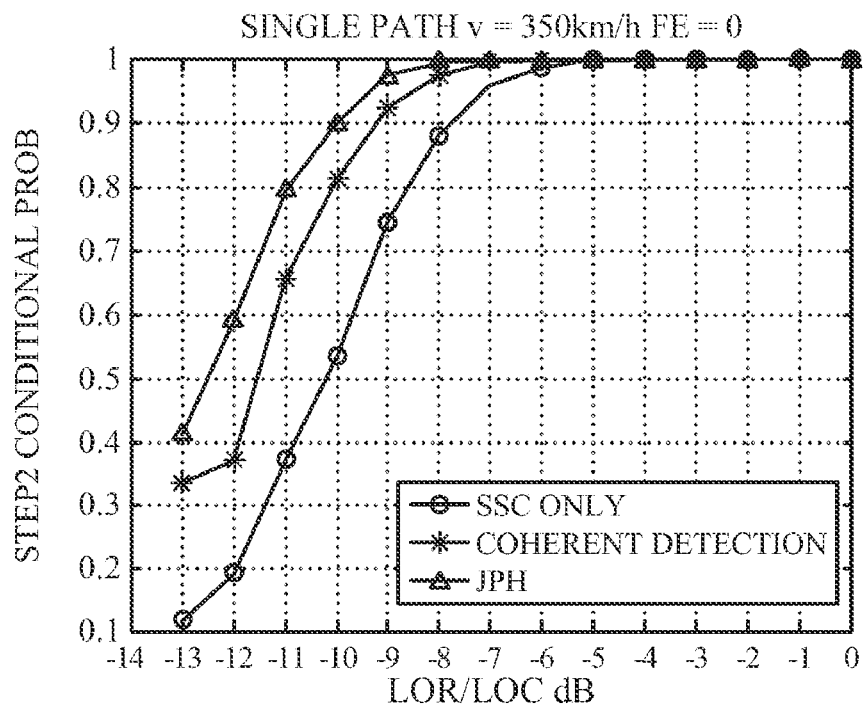
FIG. 8 is a graph that illustrates the performance of various algorithms in a single path high speed fading scenario.

FIG. 8 displays the performance under the single path high speed fading scenario. The performance of JPH is about 2.2 dB better than the conventional method and about 0.8 dB better than the coherent detection method.

Figure 9:
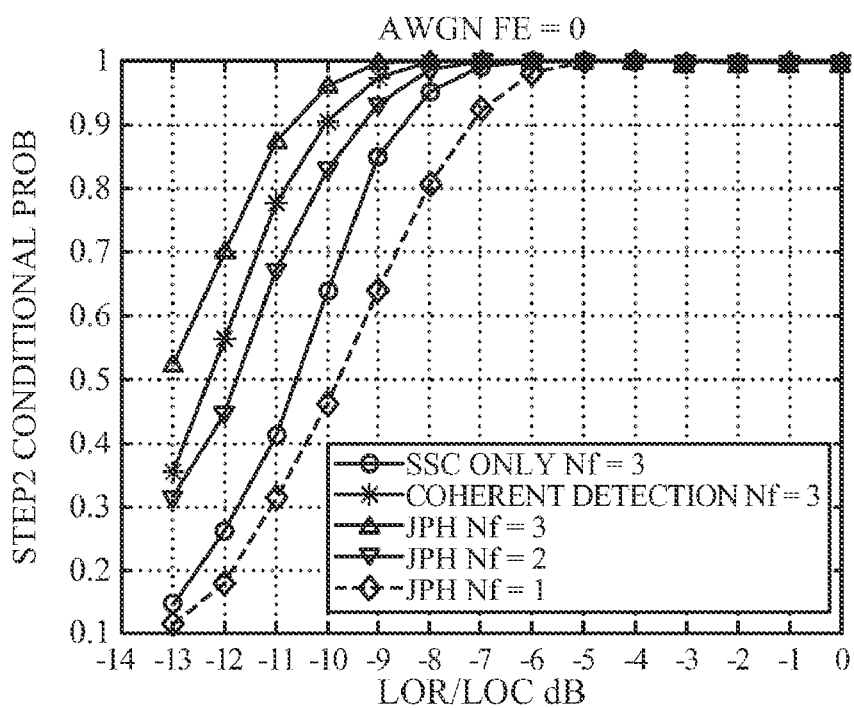
FIG. 9 is a graph that illustrates the performance of a novel algorithm with different accumulation lengths (3,2,1 frames) to prior art algorithms under AWGN.

FIG. 9 compares the performance of JPH with different Nf=3,2,1 frames.

(Note Nc=15*Nf). It can be seen that using JPH method, the accumulation length can be reduced to 20 ms (2 frames) with even better performance than the conventional method.

Figure 10:
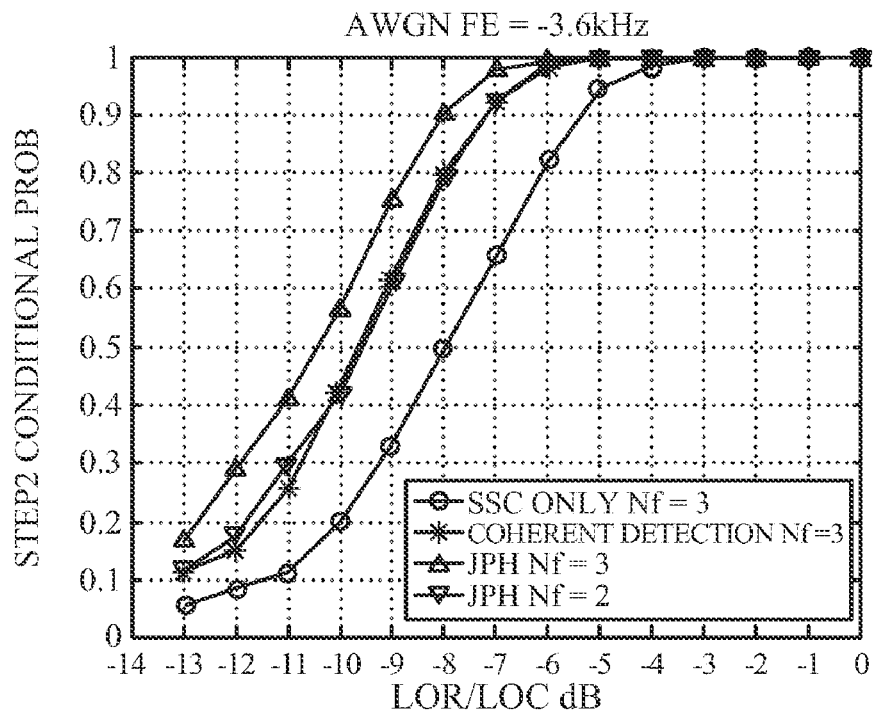
FIG. 10 is a graph that illustrates the performance of various algorithms under AWGN, with frequency error and variable accumulation length.
Figure 11:
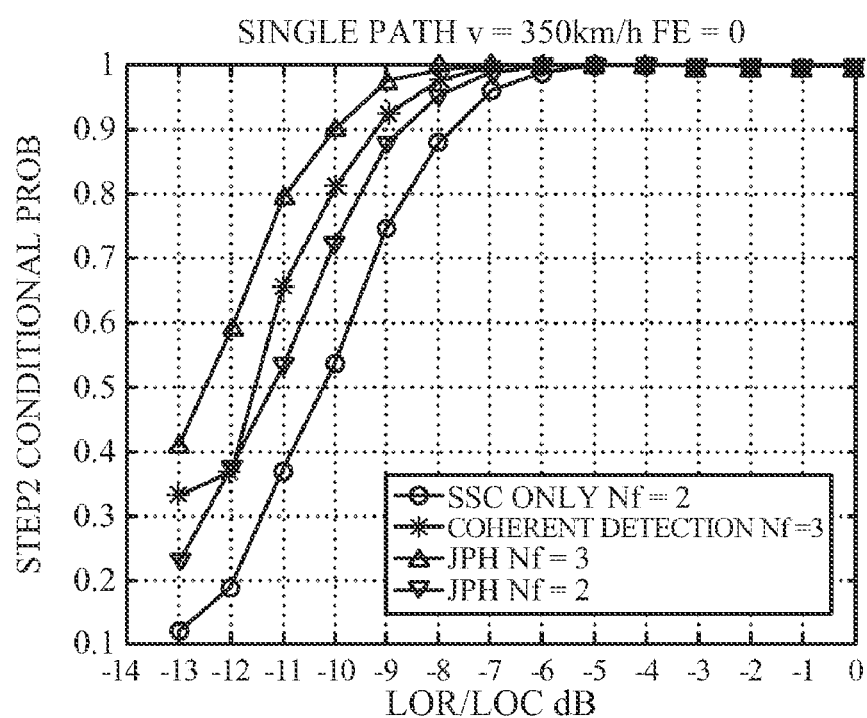
FIG. 11 is a graph that illustrates the performance of various algorithms under single path, high speed fading and variable accumulation length.

FIGS. 10 and 11 plot the performances under AWGN with frequency error and high speed fading case. Similar conclusions can be reached in these two scenarios as well.

In the performance comparisons described above, it has been shown that the JPH method performs better than the conventional method even when there is zero dB channel gain and no phase error. This section explains this performance gain.

One can look at an even simpler scenario. Assume that there are only two SSCs, SSC1 and SSC2. It is desired to identify which SSC is used for the bpg. Ignoring the no signal case, for a single bpg $$y = \begin{cases} (PSC + SSC_1) + n, & H_1 \\ (PSC + SSC_2) + n, & H_2 \end{cases} \quad (11)$$

A similar analysis can be performed and it can be derived that $$H_i = \text{argmax}\{\text{Re}((PSC + SSC_i) y^*)\} \quad (12)$$

Assume $H_1$ is the correct hypothesis. Then $$\text{Re}((PSC + SSC_2) y^*) = \text{Re}(\|PSC\|^2 + \|SSC_1\|^2 + PSC n^* + SSC_1 n^*) \quad (13)$$

And $$\text{Re}((PSC + SSC_2) y^*) = \text{Re}(\|PSC\|^2 + PSC n^* + SSC_2 n^*) \quad (14)$$

Note PSC, SSC and n are 1 by 256 row vectors (complex). Now if equation (13) and (14) are compared, it can be realized that the $\|PSC\|^2 + PSC n^*$ is common for both hypothesis. For the purpose of detection, this can be ignored. (Note even $PSC n^*$ is an AWGN noise. But the same noise is applied to both hypotheses.) Then equation (13) and (14) become $$\text{Re}(\|SSC_1\|^2 + SSC_1 n^*) = \text{Re}(SSC_1 y^*) \quad (15)$$

$$\text{Re}(SSC_2 n^*) = \text{Re}(SSC_2 y^*) \quad (16)$$

This is equivalent to using the criterion $$H_i = \text{argmax}\{\text{Re}(SSC_{i,y}^*)\} \quad (17)$$

In fact, the simulation as been performed and the results are substantially the same when using criterion (12) and (17). Now this may create a mistaken illusion that JPH and conventional should perform similar under the same AWGN channel. However, note the criteria used in JPH and conventional methods are different with (12) and (17). Their criteria can be rewritten for the single bpg case as follows:

1. Conventional (cony):

$$H_i = \text{argmax}\{|SSC_{i,y}|^2\}$$

2. Joint Phase-Hypothesis with channel gain estimation (JPH)

$$H_i = \text{argmax}\{|(PSC + SSC_i) y^*|^2\}$$

Both JPH and the conventional methods are suboptimal in this setting compared with criteria (12) and (17).

Now again assume $H_1$ is the correct hypothesis. If a conventional method is used:

$$|SSC_1 y^*|^2 = |\|SSC_1\|^2 + SSC_1 n^*|^2 \quad (18)$$
$$= |512 + SSC_1 n^*|^2$$
$$= |512 + R_1 + I_1 i|^2$$
$$= 512^2 + 1024 R_1 + R_1^2 + I_1^2$$

$$|SSC_2 y^*|^2 = |SSC_2 n^*|^2 \quad (19)$$
$$= |R_2 + I_2 i|^2$$
$$= R_2^2 + I_2^2$$

Note that square of the norm of SSC is 512. $R_1$, $I_1$, $R_2$ and $I_2$ are real and imaginary part of $SSC n^*$. They are AWGN with variance 512 $\sigma^2/2 = 512$ is due to the square of the SSC norm. ½ is due to the 2 dimensions. Note the original Ec/(Io−Ec) for SSC is $2/\sigma^2$. One common metric we use to compare different detection algorithms is the ratio of expected distance between two hypotheses over the noise standard deviation (square root of the noise variance). The larger the ratio, the better the detection algorithm. Now for conventional method, the expected distance is $E|SSC_{1,y}^*|^2 - E|SSC_{2,y}^*|^2 = 512^2$. The noise contributing to the variance for the correct hypothesis (18) is $1024 R_1 + R_1^2 + I_1^2$ and for the incorrect hypothesis (19) is $R_2^2 + I_2^2$. The variance of these two terms can be further calculated to be $1024^2 \beta + 4\beta^2$ for (18) and $4\beta^2$ for (19).

Now if the JPH method is used:

$$|(PSC+SSC_1)y^*|^2 = \left|\begin{array}{c}\|PSC\|^2+\|SSC_1\|^2+\\PSCn^*+SSC_1n^*\end{array}\right|^2 \quad (20)$$

$$= |1024+R_p+R_1+(I_p+I_1)i|^2$$

$$= 1024^2+2048R_p+2048R_1+2R_pR_1+$$

$$R_p^2+R_1^2+I_p^2+I_1^2+2I_pI_1$$

$$|(PSC+SSC_2)y^*|^2 = \left|\begin{array}{c}\|PSC\|^2+\\PSCn^*+SSC_2n^*\end{array}\right|^2 \quad (21)$$

$$= |512+R_p+R_2+(I_p+I_2)i|^2$$

$$= 512^2+1024R_p+1024R_2+2R_pR_2+$$

$$R_p^2+R_2^2+I_p^2+I_2^2+2I_pI_2$$

$R_p$ and $I_p$ are the real and imaginary part of PSCn*. They are again AWGN with variance β. Comparing (20) and (21), the expected distance is 3*512^2, thus a factor of 3 increase.

Now we can to determine whether the variance increases by a factor of 9. The noise contributing to the variance for the correct hypothesis (20) is $1024R_p+2048R_1+2R_pR_1+R_1^2+I_1^2+2I_pI_1$. This is because $1024R_p+R_P^2+I_p^2$ is common for all hypotheses and does not contribute to the variance for detection purpose. The noise contributing to the variance for the incorrect hypothesis (21) is then $1024R_2+2R_pR_2+R_2^2+I_2^2+2I_pI_2$. Now the variance for these two terms can be calculated to be $5*1024^2\beta+12\beta^2$ for (20) and $1024^2\beta+12\beta^2$ for (21). Now comparing the two variances for the correct hypothesis for two methods: $1024^2\beta+4\beta^2$ (cony) vs $5*1024^2\beta+12\beta^2$ (JPH). It's clear that that the variance increases only between 3 to 5 times. Now compare the two variances for the incorrect hypothesis for the two methods: $4\beta^2$ (cony) vs $1024^2\beta+12\beta^2$ (JPH). To reach more than a factor of 9 increase here, $\beta\leq 43690.7$. This means Ec/(Io−Ec)≧−19 dB. Note for such Ec/(Io−Ec), the detection probability is approximately 1 for both methods shown in FIG. 1. Even at this range, due to the only factor of 3 to 5 increase in the correct hypothesis variance, the JPH method still performs better.

It is also useful to study the false alarm performance. It is believed that JPH will always have a better performance in terms of false alarm than the conventional method by observing the SNR after the correlation.

Equation (1) can be modified to include the false alarm case. It is only studied for one bpg and assumed to have only one SSC.

$$y = \begin{cases}\alpha(PSC+SSC)e^{j\phi}+n, & H_1\\ n, & H_0\end{cases}$$

$H_0$ and $H_1$ are the hypotheses without signal and with signal. Now define the correlation output for conventional and JPH method as $$Z_{conv}=SSCy^*=\|SSC\|^2e^{j\phi}+SSCn^*$$

$$Z_{JPH-1}=(PSC-SSC)y^*=(\|PSC\|^2+\|SSC\|^2)e^{j\phi}+SSCn^*+PSCn^*$$

Now the SNR for $Z_{conv}$ is $\|SSC\|^2/\sigma^2=512/\sigma^2$ but the SNR for $Z_{JPH-1}$ is $(\|SSC\|^2+\|PSC\|^2)^2/(\|SSC\|^2+\|PSC\|^2)\sigma^2=1024/\sigma^2$. JPH method doubles the SNR, thus giving better false alarm performance.

The information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, it will be appreciated that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for performing the step 2 search algorithm. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus to be used in a wideband code division multiple access (WCDMA) system, the apparatus comprising:
    a first input configured to receive first data representing I and Q signals correlated with a primary synchronization code (PSC):
    a second input configured to receive second data representing the I and Q signals correlated with a plurality of secondary synchronization codes (SSCs); and
    an adder configured to add, for each particular SSC of the plurality of SSCs, the first data representing the I and Q signals correlated with the PSC with data values based on the second data representing the I and Q signals correlated with the particular SSC.

2. The apparatus of claim 1, further comprising a despreader coupled to the second input.

3. The apparatus of claim 2, wherein a Fast Fladamard Transformation is performed on an output of the despreader to generate the data values.

4. The apparatus of claim 1, further comprising a first squaring function configured to square an I output of the adder, a second squaring function configured to square a Q output of the adder, and a second adder configured to add the squared I output and the squared Q output.

5. The apparatus of claim 4, further comprising:
a memory configured to store energy values determined based on an output of the second adder; and
a sorter configured to identify a maximum energy value of the stored energy values.

6. The apparatus of claim 5, wherein the memory comprises non-coherent (ncoh) random access memory (RAM).

7. A method of searching synchronization channels in a wideband code division multiple access (WGDMA) system, the method comprising:
receiving first data representing I and Q signals correlated with a primary synchronization code (PSC);
receiving second data representing the I and Q signals correlated with a plurality of secondary synchronization codes (SSCs); and
adding, for each particular SSC of the plurality of SSCs, the first data representing the I and Q signals correlated with the PSC with data. values based on the second data representing the I and Q signals correlated with the particular SSC.

8. The method of claim 7, further comprising despreading the second data received at the second input.

9. The method of claim 8, further comprising performing a Fast Hadamard Transformation on an output of the despreader to generate the data values.

10. The method of claim 1, further comprising:
squaring an I output of the adder;
squaring a Q output of the adder; and
adding the squared I output and the squared Q output.

11. The method of claim 10, further comprising:
storing energy values based on sums of the squared I output and the squared output at a memory; and
identifying a maximum energy value of the stored energy values.

12. A mobile terminal for use in a wideband code division multiple access (WCDMA) system, the mobile terminal comprising:
means for receiving first data representing I and Q signals correlated with a primary synchronization code (PSC);
means for receiving second data representing the I and Q signals correlated with a plurality of secondary synchronization codes (SSCs); and
first means for adding, for each particular SSC of the plurality of SSCs, the first data representing the I and Q signals correlated with the PSC with data values resulting from processing the second data representing the I and Q signals correlated with the particular SSC.

13. The mobile terminal of claim 12, further comprising means for despreading the second data.

14. The mobile terminal of claim 13, further comprising means for performing a Fast Hadamard Transformation on an output of the means for despreading, 15. The mobile terminal of claim 12, further comprising:
means for squaring an I output of the first means for adding;
means for squaring a Q output of the means for adding; and
second means for adding the squared I output and the squared Q output.

16. The mobile terminal of claim 15, further comprising:
means for storing energy values based on an output of the second means for adding; and
means for identifying a maximum energy value of the stored energy values.

17. A non-transitory computer readable storage medium including instructions that, when executed by a processor, cause the processor to:
receive first data representing the I and Q signals correlated with a primary synchronization code (PSC);
receive second data representing the I and Q signals correlated with a plurality of secondary synchronization codes (SSCs); and
add, for each particular SSC of the plurality of SSCs, the first data representing the I and Q signals correlated with the PSC with data values based on the second data representing the I and Q signals correlated with the particular SSC.

18. The non-transitory computer readable storage medium of claim 17, wherein the plurality of SSCs includes sixteen SSCs.

19. The non-transitory computer readable storage medium of claim 17, further including instructions that, when executed by the processor, cause the processor to:
calculate an energy level corresponding to each of the plurality of added signals;
identify a maximum energy level of the calculated energy levels; and
determine a scrambling code group of SSCs based on the identified maximum energy level.

20. The non-transitory computer readable storage medium of claim 19, wherein the scrambling code group is a most likely code group of SSCs.

* * * * *